Feb. 15, 1927.
M. BUCKMILLER
ASSEMBLING MACHINE
Filed June 27, 1924
1,617,371
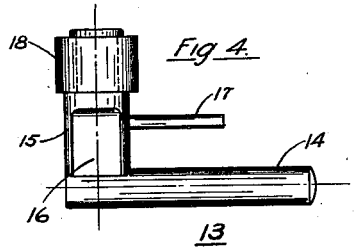
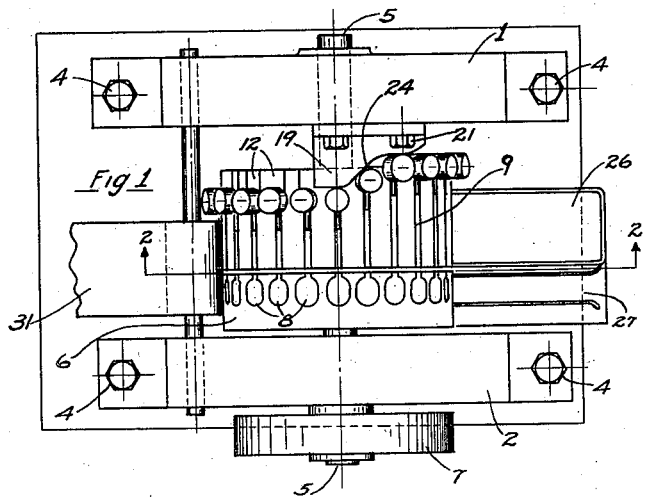
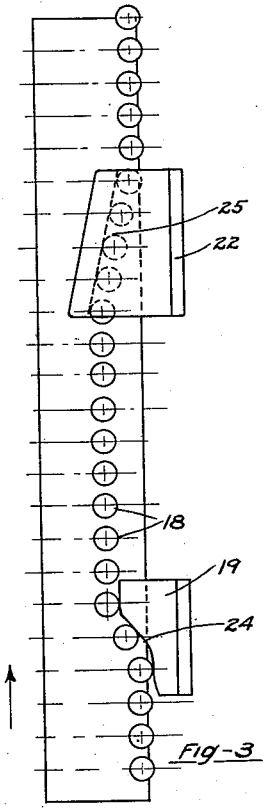
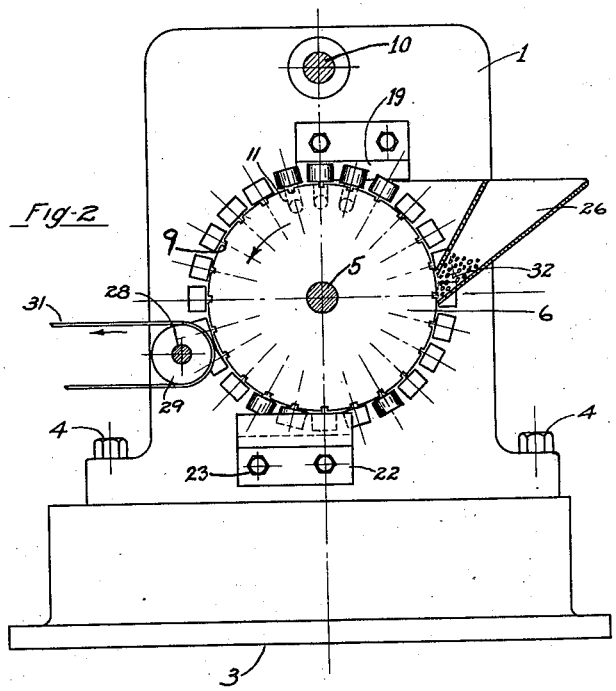
WITNESSES:
INVENTOR
MAXIMILLIAN BUCKMILLER.
BY
ATTORNEY Patented Feb. 15, 1927.

1,617,371

UNITED STATES PATENT OFFICE.

MAXIMILLIAN BUCKMILLER, OF NEW HAVEN, CONNECTICUT.

ASSEMBLING MACHINE.

Application filed June 27, 1924. Serial No. 722,849.

My invention relates to improvements in assembling machines and has particular relation to a mechanism whereby a stick or handle may be attached to a plastic composition.

An object of my invention is to provide, in a machine of the above mentioned character, a movable member having a plurality of individual molds adapted to receive a plastic composition and means actuated by the movement of the member for inserting a stick or handle in the composition.

Another object of my invention is to provide in a machine of the above mentioned character means for inserting the stick or handle in the composition without stopping the movement of the member carrying the molds.

For purpose of convenience I will illustrate and describe my invention in connection with a machine for forming the lollypop, a well known confection, which comprises a disc of candy into which a stick or handle is inserted for convenience in handling.

The above and other objects may be more readily understood by referring to the following detailed description taken in conjunction with the drawing in which:

Figure 1 is a plan view of the entire machine;

Figure 2 is a vertical section of the apparatus shown in Figure 1 taken on the line 2—2;

Figure 3 is a view in development, of the drum shown in Figures 1 and 2; and

Figure 4 is a view, in detail, of a part of the apparatus shown in Figure 1.

A pair of housing members 1 and 2 are secured to a base (3) in any suitable manner such as by a plurality of bolts (4). The housing members 1 and 2 serve as bearings for a shaft (5). A cylinder or drum (6) is fixedly mounted upon the shaft (5) between the housing members 1 and 2. One end of the shaft (5) is extended through the housing member (1) and a pulley-wheel (7) is secured thereto.

A plurality of individual recesses or molds (8) are cut into the surface of the cylinder (6) near one end thereof. The molds (8) are equally spaced apart.

A complementary cylinder (not shown) is keyed to the shaft (10) and rotates therewith. Candy is adapted to be introduced between the two cylinders through a chute (27) in a manner well known in the art such as is shown and described in the patent to Woolf, No. 971,097, patented Sept. 27, 1910.

A groove or slot (9) is cut in the cylinder (6) adjacent each of the molds (8) extending toward the opposite end of the cylinder.

In the opposite end of the cylinder (6) from the molds (8) a plurality of holes (11) are drilled parallel to, and in radial alinement with, the slots (9). In the opposite end of the cylinder (6) from the molds (8) a plurality of recesses (12) are cut. The recesses (12) and the drilled holes (11) form a receptacle for a cam lever (13).

Referring to Figure 4 of the drawing the cam lever (13) is shown as comprising a member having a base (14) which is machined to a diameter slightly less than that of the drilled holes (11), and an upright portion (15), two sides of which are machined to a plane surface as at (16). A plunger (17) is secured to the upright portion (15). The upper part of the upright portion (15) is machined to receive a metal bearing-collar (18). The cam lever (13) is so constructed that when the base portion (14) is inserted in one of the drilled holes (11), the plunger (17) will lie in the slot (9). The recess (12) acts on the plane surfaces (15) as a guide during movement of the cam lever.

A cam member (19) is secured to the housing (1) in any convenient manner such as by a plurality of bolts (21). A second cam member (22) is secured, by means of a plurality of bolts (23), to the housing (1). The cam members (19) and (22) are preferably placed adjacent diametrically opposite points of the cylinder (6). The cam members (19) and (22) have bearing surfaces (24) and (25) respectively which are adapted to contact with and force the cam levers (13) in opposite directions upon rotation of the cylinder (6). A hopper (26) and a chute (27) are also provided for a purpose to be hereinafter more fully described. A shaft (28) is journaled in the housing members (1) and (2). A pulley (29) is mounted on the shaft (28) and serves to support conveyor belt (31).

The operation of the machine is as follows:

A supply of candy heated to a certain degree of plasticity is introduced into the chute (27). A number of sticks (32) are then placed in the hopper (26). The pulley (7) is then connected by a belt to any convenient source of power (not shown) and the cylinder (6) will revolve. As each of the slots (9) passes by the lower open end of the hopper (26) one of the sticks (32) will drop into the slot and be carried around with the cylinder (6). At the same time the candy in the chute (27) will fill each of the molds (8). As the collar (18) of the cam lever (13) comes into contact with the bearing face (24) of the cam (19), the cam lever is caused to slide toward the opposite end of the cylinder (6). The plunger (17) which is adapted to slide in the slot (9) thus forces the stick (32) along the slot (9) into the mold (8). The stick (32) is thus forced into the candy with which each mold is filled at the instant of compression between the cylinder (6) and its complementary cylinder. After the stick (32) has been forced into the candy the candy is chilled in any well known manner such as by an air-blast (not shown). On continued rotation of the cylinder the chilled candy drops out of the mold on to the conveyor belt (31) by which it is carried away for wrapping and packing. When the rotation of the cylinder (6) brings the collar (18) of the cam lever (13) into engagement with the bearing face (25) of the cam member (22) the cam lever (13) is returned to its initial position. Since the above cycle of operation will be repeated on continued rotation of the cylinder (6) it will be seen that the operator need only replenish the supply of candy and sticks from time to time.

I do not wish to be restricted to the specific structure herein set forth as it is evident that various modifications thereof may be made within the spirit and scope of my invention. I desire therefore that only such limitations shall be imposed as are indicated in the appended claims.

I claim as my invention:

1. An assembling machine comprising a movable mold, a slot adjacent said mold and adapted to receive a rod, and means, actuated by the movement of said mold, for gradually forcing said rod into said mold.

2. In an assembling machine, the combination with a continuously rotating cylinder having a plurality of individual molds adapted to receive a plastic composition, of a plurality of rods, and means, comprising a plurality of cam levers and a cam, and actuated by the rotation of said cylinder, for forcing one of said rods into the composition contained in each of said molds.

3. An assembling machine comprising a movable member having a plurality of molds, a slot adjacent each of said molds, means for introducing a rod into each of said slots, and means actuated by the movement of said member for successively forcing each of said rods gradually into the corresponding mold.

4. In an assembling machine, the combination with a movable member having a plurality of individual molds, of a hopper mounted adjacent thereto, adapted to contain loose rods, means on said member for receiving said loose rods one by one from said hopper, and plunger means actuated by the movement of said member alone for successively and gradually forcing a rod into each of said molds.

5. An assembling machine comprising a rotatable cylinder, a plurality of molds formed in said cylinder, a slot in said cylinder adjacent each of said molds, means for inserting a rod into each of said slots, and means governed by the rotation of said cylinder for successively forcing each of said rods into the corresponding mold.

6. An assembling machine comprising a rotatable cylinder, a mold in said cylinder, a slot in said cylinder adjacent said mold, a plunger adapted to fit into said slot at the opposite end thereof from said mold, means for introducing a rod into said slot between said plunger and said mold, a projection on said plunger, a cam member, adapted to engage said projection upon rotation of said cylinder, to force said plunger to travel in said slot toward said mold, and a second cam member adapted to engage said projection, upon continued rotation of said cylinder, to cause said plunger to assume the initial position.

7. An assembling machine comprising a rotatable cylinder, a plurality of molds in said cylinder, a slot adjacent each of said molds, a plunger adapted to fit in each of said slots at the opposite ends thereof from said molds, means for introducing a rod into each of said slots between said plunger and said mold, a projection on said plunger, a cam member adapted to engage each of said projections, upon rotation of said cylinder, to cause each of said plungers successively to force each of said rods along each of the slots into the corresponding mold, and means for successively returning each of said plungers to the initial position.

8. An assembling machine comprising a movable mold adapted to contain a plastic material, a slot adjacent said mold and adapted to receive a rod, and means, actuated by the movement of said mold for gradually forcing said rod into said mold at a uniform speed regardless of the consistency of said plastic material.

9. An assembling machine comprising a movable member having a plurality of molds adapted to receive a plastic material, a slot adjacent each of said molds, means for introducing a rod into each of said slots, and means actuated by the movement of said member for successively forcing each of said rods into the corresponding mold at a uniform speed regardless of the consistency of the plastic material contained therein.

In testimony whereof, I have hereunto subscribed my name this 6th day of June, 1924.

MAXIMILLIAN BUCKMILLER.